J. H. McGRATH.
EMERGENCY SAND VALVE.
APPLICATION FILED DEC. 24, 1914.

1,141,131.

Patented June 1, 1915.
2 SHEETS—SHEET 1.

WITNESSES
Hugh M. Sweeny
C. M. Hauch

John H. McGrath INVENTOR.

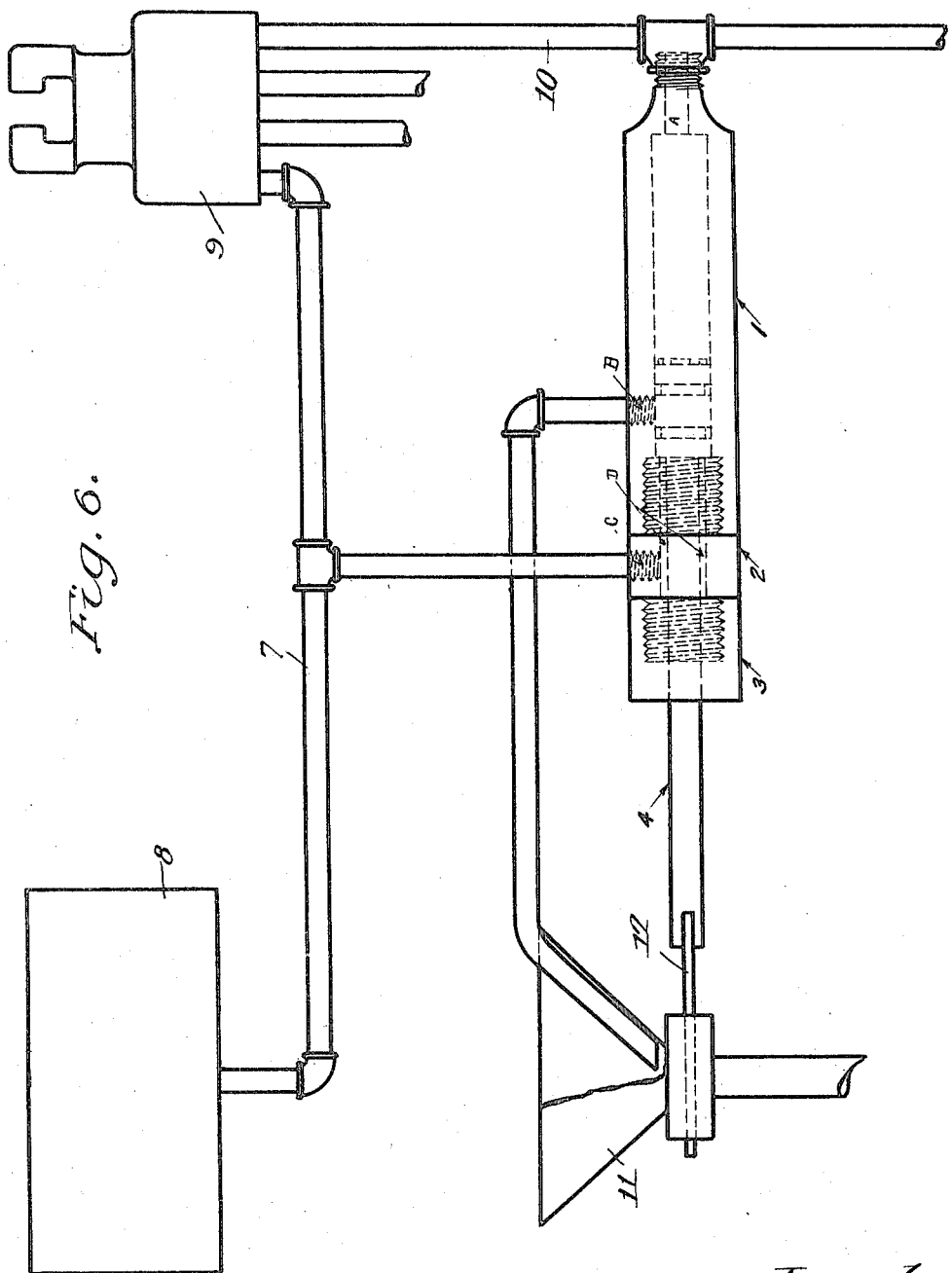

UNITED STATES PATENT OFFICE.

JOHN H. McGRATH, OF KNOXVILLE BOROUGH, PENNSYLVANIA.

EMERGENCY SAND-VALVE.

1,141,131.  Specification of Letters Patent.  Patented June 1, 1915.

Application filed December 24, 1914. Serial No. 878,930.

*To all whom it may concern:*

Be it known that I, JOHN H. McGRATH, a citizen of the United States, residing at 422 Orchard street, Knoxville borough, in the county of Allegheny and State of Pennsylvania, have invented a new and useful Emergency Sand-Valve, of which the following is a specification.

My invention relates to improvements in an emergency sand valve in which a piston operates in a cylinder by the compressed air carried on street railway cars or locomotives or railroad trains whenever the operator or engineer uses his emergency air brake, and the object of my improvement is to place sand upon the rails simultaneously with the braking of the wheels by the emergency air brake. I attain this object by the mechanism illustrated in the accompanying drawings in which—

Figures 2, 3:
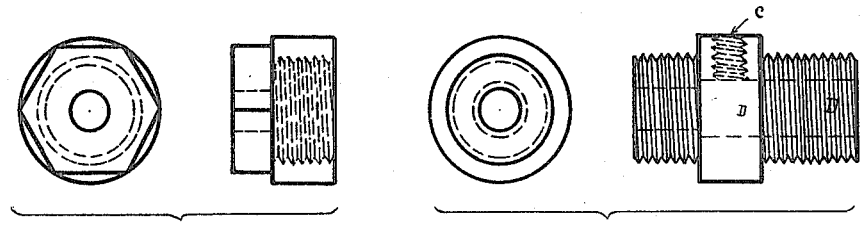
Figure 1:
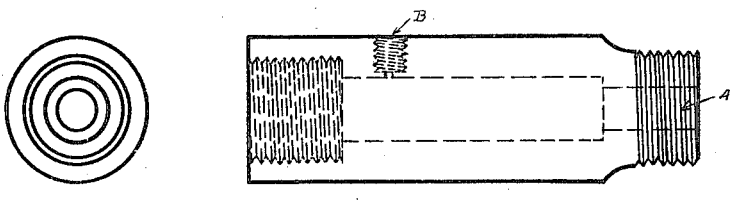
Figure 4:
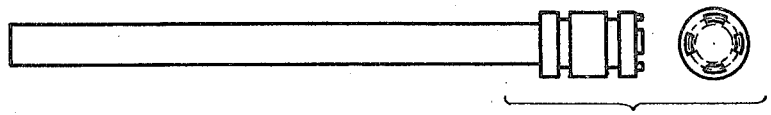
Figure 5:
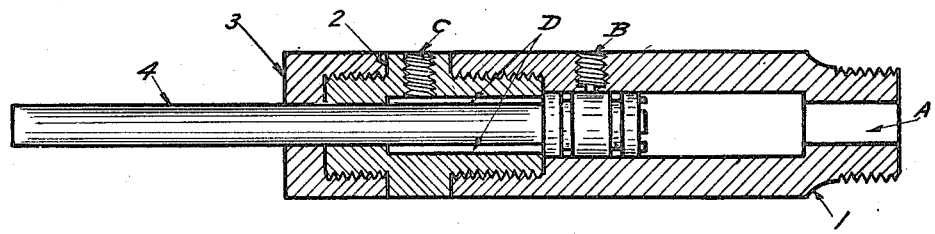

Figure 1 is the cylinder or body of the valve and also shows the end view of the cylinder; Fig. 2 is the cap for the cylinder and also the guide for the piston rod; Fig. 3 is the stuffing box nut showing both end and side view; Fig. 4 is the piston showing side and end view, the end view showing boss; Fig. 5 is the complete assembled cross section view of the valve and its parts; and Fig. 6 is the complete assembled view of the valve showing its connection with the sand lever, sand box, supply and emergency brake pipe.

Similar figures refer to similar parts throughout the several views.

The cylinder (1) is a cylinder threaded on both ends, on one end the thread is on the outside and the other end on the inside, and it is bored smooth to make a neat fit for the piston (4) which works inside the cylinder.

(2) is a cap for the cylinder. The one end is threaded to screw into the cylinder and the other end is threaded to fit the stuffing box nut (3). (2) has a counterbored hole in it. One end of the hole is drilled just large enough for the piston rod to work in freely, and the other end is counterbored larger than the piston rod so as to form port D.

(3) is a stuffing box nut. It is threaded on the inside to fit one end of (2) and it has a hole in it for the piston rod (4) to work freely through.

(4) is a piston made for two piston rings, the one end to connect with the sand lever and the other end has a " boss " on it that is divided in the four slots so that the piston cannot shut off the air in port A. When I have occasion to use the sand valve, this " boss " lets the air come through port A up behind the piston (4) and allows me to have the entire surface of the piston covered with air when the emergency pipe is full of air.

Fig. 5 is the complete assembled cross section view of the valve and its parts showing ports D and A open and port B closed and the piston in its position of rest when the engineer's brake valve is not being used.

Fig. 6 represents the complete assembled view of the valve showing its connection with the sand lever, sand box, supply and emergency brake pipe carried on street railway cars and locomotives. The supply pipe 7 runs from the compressed air reservoir 8 to the engineer brake valve 9 and the emergency brake pipe 10 runs from the engineer's brake valve to emergency valve. Both these pipes contain the same pressure of air when the engineer brake valve is closed or not being used, and the pressure in port A and port C is equal but the surface of the end of the piston head of my valve next to port A being greater than the surface of the piston head next port C, the valve is held at rest in the position shown, one piston ring on each side of port B thus closing port B, from which a pipe leads to the sand box 11.

When the engineer's brake valve is thrown into emergency position by the operator, the pressure in the emergency brake pipe is exhausted into the open and the pressure in the supply pipe forces the piston up to port A, thus pulling open the sand box, the sand lever 12 being connected with the piston as shown. When the piston head moves past port B a part of the compressed air passes out though the pipe leading to the sand box and roils the sand. When the operator throws back the engineer's valve, the emergency brake pipe fills with compressed air from the reservoir and the piston of my valve returns to its position of rest because of the greater surface being next to port A as above explained and the sand box is closed as is also port B.

I claim—

The combination in an emergency sand valve of a cylinder having a counterbored hole to admit compressed air from the supply pipe on one side of the piston head through a port leading from the supply pipe into one end of the cylinder, the other end of the cylinder connected with the compressed air emergency brake pipe, with a piston having two rings, the portion thereof between the rings covering, when not in action, a port in the cylinder leading to the sand box, the one end of the piston protruding from the cylinder through a stuffing box nut to be connected with the sand lever, and the other end of the piston having a "boss" on it that is divided into four slots so that the piston cannot shut off the compressed air in the port leading to the emergency pipe, all substantially as set forth.

JOHN H. McGRATH.

Witnesses:
HUGH M. STILLEY,
PEARL M. MERIT.

Copies of this patent may be obtained for five cents each, by addressing the "Commissioner of Patents, Washington, D. C."